Feb. 5, 1952     N. E. FAZENBAKER     2,584,795
DRY RENDERING OF SEWER GREASE
Filed Oct. 20, 1948
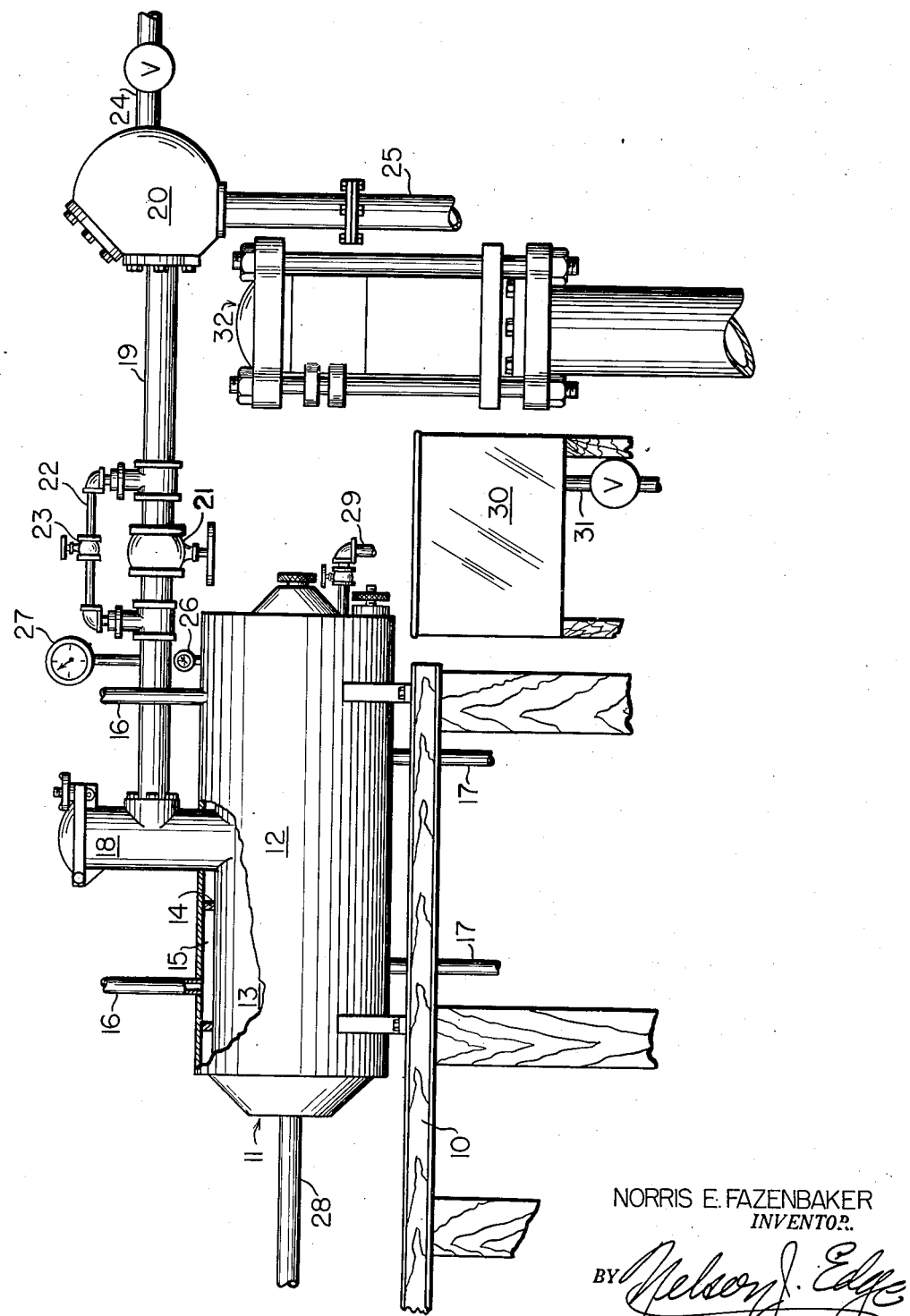
NORRIS E. FAZENBAKER
*INVENTOR.*
BY
ATTORNEY Patented Feb. 5, 1952

2,584,795

UNITED STATES PATENT OFFICE 2,584,795

DRY RENDERING OF SEWER GREASE

Norris E. Fazenbaker, West New York, N. J.

Application October 20, 1948, Serial No. 55,490

6 Claims. (Cl. 260—412)

The present invention relates to dry rendering of sewer grease in a meat packing plant.

Sewer grease as used throughout this specification and claims includes all animal tissue and fat which according to present packing house practice reaches the plant sewer. Principal sources of sewer grease are the refuse from frankfurter and sausage manufacture, and scraps and grease which are washed from the buggies used for transporting carcasses, also from the kiln floor. As the various parts of the plant are washed down with soap and flushed clean, the grease runs into the plant sewer and is caught in a catch basin, where it floats on top of the water, is skimmed off by a dipper and put in buggies.

Up to now it has been customary to wet render sewer grease by passing steam therethrough. The product of wet rendering is merely a somewhat purified grease of small commercial value, the more volatile elements of the sewer grease having passed off with the steam. Due to the very large amounts of sewer grease which must be treated, and to the small monetary value of the product, sewer grease has long been recognized as an economic problem of the meat packing industry.

It should be mentioned that it has not been considered practical to dry render sewer grease. Other animal scrap, containing fragments of bone, hide, and flesh as well as fat, are dry rendered in a steam jacketed, closed cooker and the product of this process is grease and crackling, the latter being obtained by pressing the product in a hydraulic press under three hundred tons pressure. Crackling has a much higher value than grease, being used for poultry feed, fertilizer, domestic glue and many other purposes. But dry rendered sewer grease has even less value than the wet rendered product because it lacks the consistency to permit pressing to produce crackling, and contains unsightly suspended particles which the wet process washes out.

An object of the present invention is to extract crackling from sewer grease.

Another object is to increase the yield of grease from the rendering process.

Other objects will appear as the description proceeds.

In accomplishing the objects of the present invention, pressed crackling of high glue content, and restaurant scrap fat are added to the sewer grease and the mixture is then dry rendered in conventional dry rendering equipment for a certain time under certain conditions of temperature and pressure as described hereafter.

The accompanying drawing illustrates conventional dry rendering equipment as presently used to extract crackling and grease from other animal scrap, the illustration being provided as an aid to the comprehension of the method of the present invention.

Referring now in detail to the drawing, a frame 10 supports the dry render cooker 11. The cooker illustrated is of the Albright-Nell type, and comprises an outer cylindrical shell 12 and an inner cylindrical shell 13, supported concentrically in the outer shell by spacers 14. Steam enters the space 15 between the shells 12, 13 by inlet pipes 16 and leaves by outlet pipes 17. A charging dome 18 connects with the interior of inner shell 13 and a vapor line 19 of 4 inch diameter leads from dome 18 to the condenser 20. A four inch valve 21 is in vapor line 19. A bypass 22 of three quarter inch pipe and comprising a three quarter inch valve 23 extends around valve 21 on line 19. A water supply line 24 leads to condenser 20 and a discharge pipe 25 leads therefrom. Gage 26 indicates external pressure, that is, steam pressure in the space 15. Gage 27 indicates internal vacuum or pressure, that is, inside shell 13. A rotary shaft 28 extends axially of shell 13 and carries paddles, not shown, which continually agitate the contents.

In conventional dry rendering, the animal scrap is loaded into dome 18, cooked on open vent (valve 21) for a certain time under certain external steam pressure, the malodorous vapors passing through line 19 to condenser 20 where they are condensed by mixing with water and discharged through line 25. The batch is further cooked on closed vent under definite conditions of time and internal pressure or vacuum, discharged through pipe 29 to vat 30, the grease in liquid state passing therefrom by pipe 31 while the crackling is shoveled into buggies, loaded into the hydraulic press 32 and pressed into cake form under three hundred tons pressure, yielding further grease.

The process of the invention follows:

Charge a 12,000 lb. cooker with
    7,000 lb. sewer grease
    700 lb. pressed crackling, high glue content
    1,500 lb. restaurant scrap fat.

Cook one hour on open vent under 80 lbs. external pressure, close vent, set bypass valve to reach 10 lbs. internal pressure, when this pressure is reached set bypass to drop to five inches of vacuum over a period of about one hour 20 minutes. Within the next five to ten minutes the mass should reach the proper temper to press the crackling. Temper refers principally to moisture content, ideal content being about five percent of weight, as is well known.

The ten pounds of internal pressure is usually reached in about 20 minutes. The eighty pounds external pressure is maintained throughout the process. At the end of the hour and twenty minute period, the dome is opened and the moisture content is sampled by an experienced operator by feeling a sample of the batch with his hand. This is referred to as sampling the batch for temper. The dome is then closed and vacuum develops over the remainder period, which is about five to ten minutes according to the operator's judgment.

The yield of the above process from the above charge of ninety-two hundred pounds is approximately three thousand pounds of grease and seventeen hundred pounds of cracklings. As the restaurant scrap fat when conventionally dry rendered would yield thirty to thirty-five percent cracklings or from four hundred and fifty to five hundred and twenty-five pounds, a net increase in crackling yield of from four hundred seventy-five to five hundred and fifty pounds is made available by use of the process.

The grease yield of my new dry process is twice as much and higher in quality than the yield of the wet process, the suspended particles characteristic of dry rendered straight sewer grease being absent, presumably having agglomerated with the crackling.

It will thus be seen that there is provided a device in which the several objects of this invention are achieved, and which is well adapted to meet the conditions of practical use. As various possible embodiments might be made of the above invention, and as various changes might be made in the embodiments above set forth it is to be understood that all matter herein set forth or shown in the accompanying drawing is to be interpreted as illustrative and not in a limiting sense.

What is claimed is:

1. Method of recovering the fat and non-fat solids of sewer grease which comprises admixing sewer grease with cracklings, subjecting said mixture to dry rendering thereby to effectuate the agglomeration of the aforesaid non-fat solids of the sewer grease by the said cracklings and to release the fat content of the sewer grease, followed by the step of separating the fats from the residue of solids.

2. Method of recovering the fat and non-fat solids of sewer grease which comprises admixing sewer grease with scrap fat, subjecting said mixture to dry rendering thereby to effectuate the agglomeration of the aforesaid non-fat solids of the sewer grease by the crackling of the scrap fat and to release the fat content of the sewer grease, followed by the step of separating the fats from the residue of the solids.

3. Method of recovering the fat and non-fat solids of sewer grease which comprises admixing sewer grease with crackling and scrap fat, subjecting said mixture to dry rendering thereby to effectuate the agglomeration of the aforesaid non-fat solids of the sewer grease by the said crackling and the crackling of the scrap fat and to release the fat content of the sewer grease, followed by the step of separating the fats from the residue of solids.

4. Method of recovering the fat and non-fat solids of sewer grease which comprises admixing sewer grease with crackling of high glue content and restaurant scrap fat, substantially in the proportion of 700 lbs. of crackling and 1,500 lbs. of said scrap fat to 7,000 lbs. of sewer grease, subjecting said mixture to dry rendering thereby to effectuate the agglomeration of the aforesaid non-fat solids of the sewer grease by the said crackling and to release the fat content of the sewer grease, followed by the step of separating the fats from the residue of the solids.

5. Method of recovering the fat and non-fat solids of sewer grease which comprises admixing sewer grease with crackling of high glue content and restaurant scrap fat, substantially in the proportion of 700 lbs. of crackling and 1,500 lbs, of said scrap fat to 7,000 lbs, of sewer grease, subjecting said mixture to dry rendering, thereby to effectuate the agglomeration of the aforesaid non-fat solids of the sewer grease by the said crackling and to release the fat content of the sewer grease, said dry rendering being carried out by cooking the mixture for about one hour under an open vent in a vessel that is under a steam pressure of 80 lbs. p. s. i., then subjecting said mixture to an internal pressure in said vessel of 10 lbs. p. s. i., gradually reducing said internal pressure to 5 inches of vacuum over a period of about 1 hour and 20 minutes, sampling said mixture to ascertain the moisture content thereof, resuming the cooking under vacuum for a short period until the crackling content thereof reaches the temper for pressing, followed by the step of separating the fats from the residue of solids.

6. Method in accordance with claim 5, wherein the short period is of from 5 to 10 minutes in duration.

NORRIS E. FAZENBAKER.

REFERENCES CITED

The following references are of record in the file of this patent:

UNITED STATES PATENTS

| Number | Name | Date |
| --- | --- | --- |
| 829,954 | Edson | Sept. 4, 1906 |
| 1,394,736 | Kamrath | Oct. 25, 1921 |
| 1,578,245 | Laabs | Mar. 23, 1926 |
| 1,950,360 | Laabs | Mar. 6, 1934 |